H. S. CORNISH.
APPARATUS FOR AUTOMATICALLY MEASURING, MIXING, AND DELIVERING CARBONATED LIQUIDS.
APPLICATION FILED DEC. 31, 1907.
992,166.
Patented May 16, 1911.
2 SHEETS—SHEET 2.
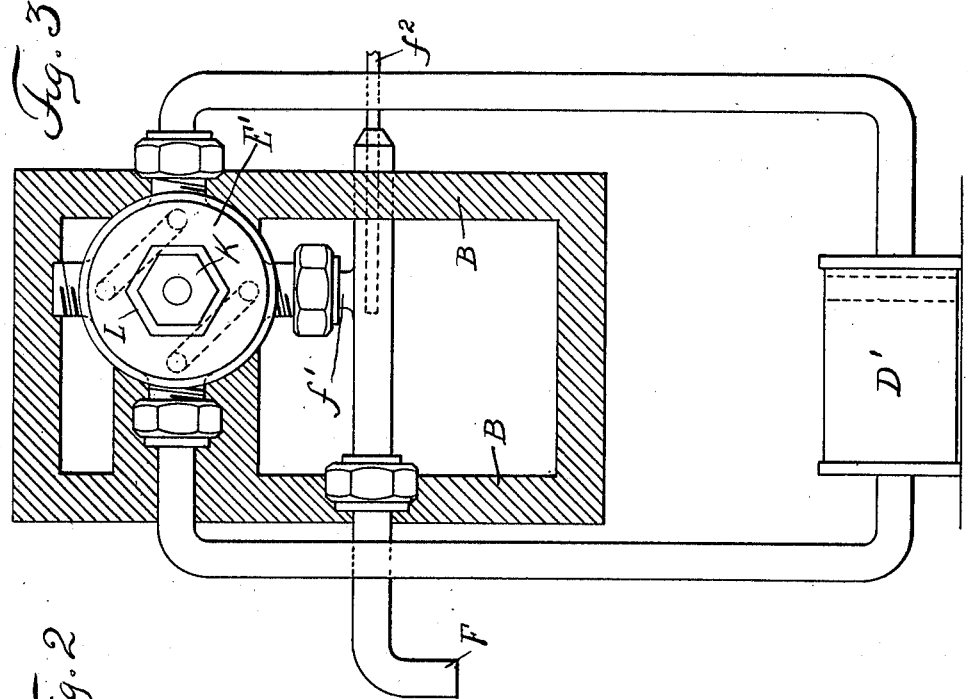
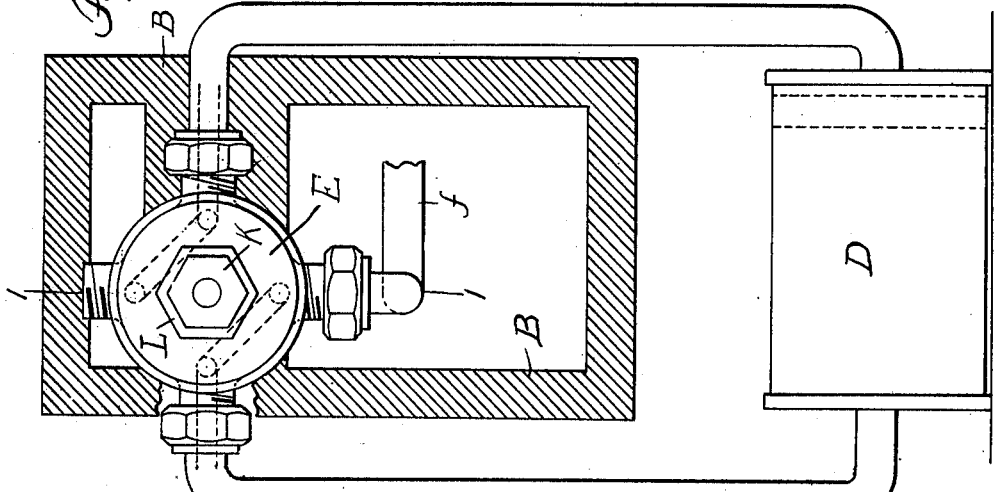
WITNESSES
INVENTOR
Harry S. Cornish
BY
Townsend & Decker
ATTORNEYS

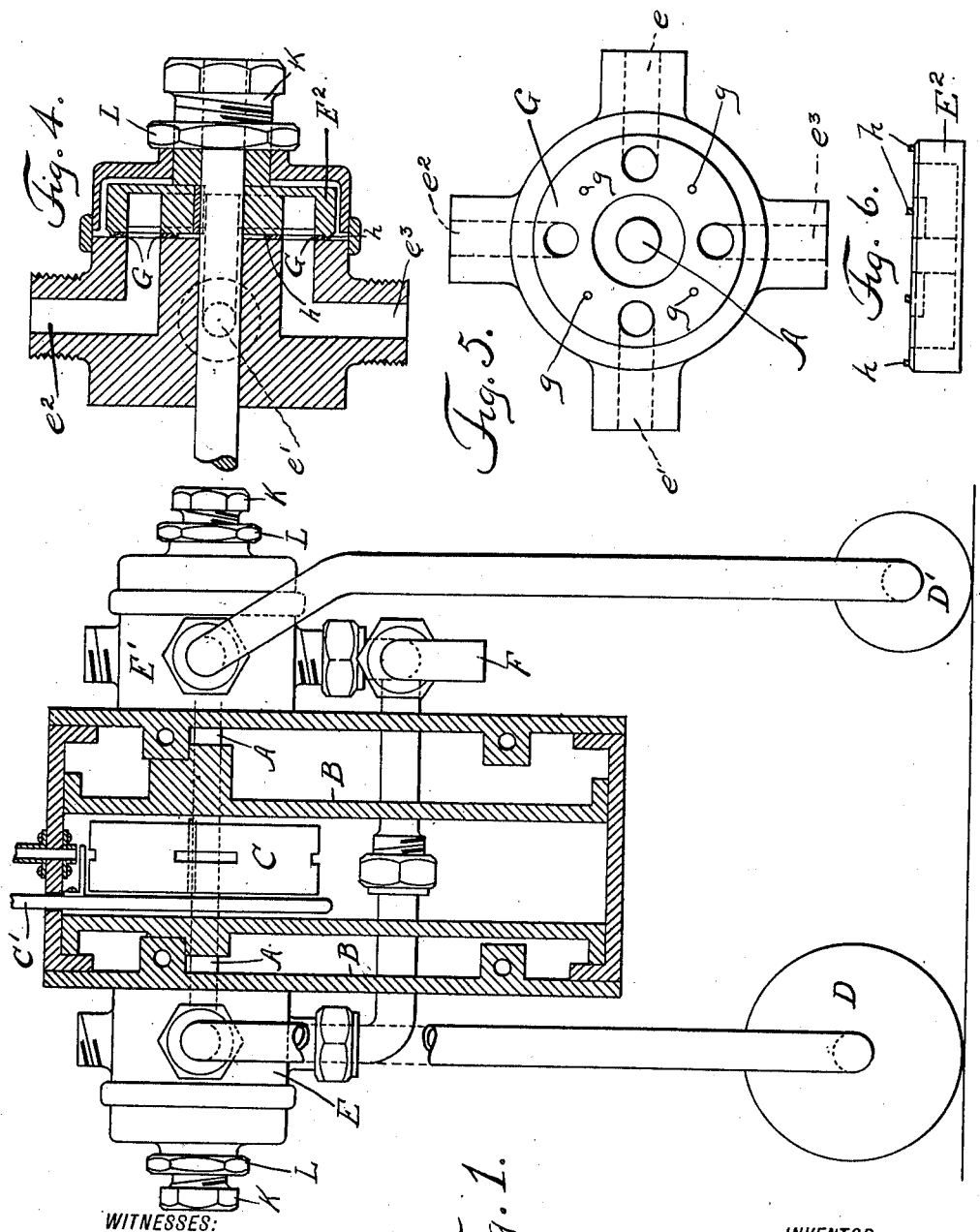

UNITED STATES PATENT OFFICE.

HARRY SEYMOUR CORNISH, OF NEW YORK, N. Y.

APPARATUS FOR AUTOMATICALLY MEASURING, MIXING, AND DELIVERING CARBONATED LIQUIDS.

992,166.     Specification of Letters Patent.     Patented May 16, 1911.

Original application filed November 1, 1905, Serial No. 285,393. Divided and this application filed December 31, 1907. Serial No. 408,789.

*To all whom it may concern:*

Be it known that I, HARRY SEYMOUR CORNISH, a citizen of the United States, and a resident of the city of New York and borough of Brooklyn, in the county of Kings and State of New York, with post-office address 118 Park avenue, have invented certain new and useful Improvements in Apparatus for Automatically Measuring, Mixing, and Delivering Carbonated Liquids, of which the following is a specification.

My invention relates to apparatus for automatically measuring, mixing and delivering two liquids of different kinds and in any desired measured proportions.

The object of the invention is to provide a simple, cheap and effective apparatus by means of which the operations of drawing, measuring, mixing and delivering the mixed liquid may be performed in an expeditious manner.

The invention is especially useful in measuring, mixing and dispensing mixed drinks in which the two liquids making the drink consist of a diluent like water preferably carbonated and a flavoring syrup.

By my invention the mixed liquids may be dispensed in unvarying proportions and without variation due to the accumulation of gas when the diluent is a carbonated liquid or to varying viscosity of the flavoring or other constituent liquid.

A further object of my invention is to insure an expeditious operation of the apparatus to permit drinks to be drawn in immediate succession and without delay from the action of the portion of the apparatus by which the flavoring syrup is measured.

In the accompanying drawings, Figure 1 is a front elevation and partial vertical section of so much of an apparatus embodying my invention as is necessary to disclose its manner of construction and operation. Fig. 2 is a side elevation and partial section looking from one side and Fig. 3 is a similar view looking from the other side. Fig. 4 is a vertical section through one of the two valves on the line 1, 1, of Fig. 2. Fig. 5 is a plan view showing the valve seat in the valve body. Fig. 6 is an edge view of the disk valve.

A indicates the valve carrying shaft of the apparatus and B suitable framework upon which the parts are mounted. The manner and means of operating this shaft form no particular part of my invention, but I have, for the sake of illustration, shown a shaft as provided with a coupler C provided with slots adapted to receive the coin of proper size and to support the same in the path of a manually-operated actuating device after the manner described in patent to J. P. Muth, dated June 14, 1904, No. 762,429.

The coin chute and opening through which the coin is delivered to the coupler are merely indicated. The manual operating device is typified by a loosely mounted lever $C'$ mounted on shaft A and provided with a projection adapted to engage the coin, thereby coupling the handle and shaft A, as more particularly set forth in the patent above referred to.

E, $E'$ indicate the valve casings for two separate valves both mounted upon said shaft so as to be actuated together when the shaft is turned.

D is a piston-measuring cylinder by which the carbonated liquid is measured. The ends of said cylinder are connected respectively to suitable valve ports of the valve in casing E whereby the ends of said cylinder may be alternately connected to the source of supply and to the discharge pipe of the apparatus.

The construction of valve, when the same is a four way valve, is indicated in Fig. 4. Its ports, $e$, $e'$ would connect respectively with the opposite ends of the cylinder. The port $e^2$ leads from a suitable source of charged liquid, under pressure, such as a carbonated water and the port $e^3$ connects by pipe $f$ with the discharge or outlet pipe F into which also opens the corresponding port for the other valve or valves of the combination. For the sake of simplicity, the source of liquid supply joined to port $e^2$ is omitted. The other valve may be of similar construction and connected, for instance, by port $e^2$ to a tank containing a flavoring syrup. In connection with the latter valve, whose casing is indicated at E', I use a measuring cylinder D' similar to D and operating in connection with said valve and with the discharge pipe in practically the same way as the measuring cylinder D used with valve E. The liquid measured by piston-measuring cylinder D' passes from the second valve through pipe $f'$ to the discharge pipe F and the liquid passing from the measuring cylinder D is delivered under pressure through pipe $f$ into the discharge pipe F, preferably by way of an ejector nozzle $f^2$ arranged as shown at or near the point of discharge of pipe $f'$ into pipe F so as to act by exhaust to forcibly pull the viscous syrup or fluid from the measuring cylinder D' and at the same time produce a thorough mixture of the syrup and carbonated liquid or other liquids.

In the case of the cylinder D', it is desirable that the flavoring syrup or liquid should be supplied under pressure at port $e^2$ of the valve in casing E', although this is not absolutely necessary since the exhaust action of the ejector will serve either wholly as a means for drawing the piston back and forth or will assist the positive pressure of the liquid as furnished to port $e^2$ according to circumstances. Each valve preferably comprises within the casing E or E', a disk $E^2$ seated on one face against a plane face of the valve body provided with openings connected with the several ports of the valve body and adapted to register with appropriate ports in the disk $E^2$ as shown, thus making up a four way valve by a quarter turn of which the liquid measured in one end of the cylinder D, for instance, may be discharged into pipe $f$, while at the same time the connection is open from port $e^2$ to the opposite end of said cylinder to assist in forcing out the liquid already measured and measure a fresh quantity of liquid for the next discharge, this operation being repeated in alternation and in a well known way for each quarter turn of the shaft.

Assuming that the apparatus is employed for dispensing ginger ale, the one valve would have its port $e^2$ connected with the tank of carbonated water and the other valve would have its similar port connected with a tank of ginger ale syrup. The combined contents of piston-measuring cylinder D and piston-measuring cylinder D' exactly equals the amount of ginger ale required for one drink. By operating shaft A the liquids in the two measuring cylinders will be immediately conducted to the discharge pipe, and the carbonated liquid in passing through the nozzle $f^2$ will aid in drawing the syrup from the cylinder D' and the latter will fill with the measured quantity of syrup from its opposite end simultaneously with the filling of the measuring cylinder D on one side of the piston which takes place simultaneously with the discharge of its contents at the opposite side through the valve, the valve ports having, by the turning of the shaft into position to dispense a drink, been brought to position to cause the simultaneous measuring out of the ingredients of another drink in the two measuring cylinders. The fresh measured quantities of syrup and water are therefore immediately available for the drawing of another drink just as soon as the drawing of the previous drink has been completed.

In order to avoid the necessity of stuffing boxes around the shaft A and to make it possible to employ an indefinite number of valves on the same shaft, I prefer to employ the manner of packing the valve illustrated in detail in Figs. 4, 5 and 6 in which G indicates a ring or disk of leather or other suitable material mounted upon that face of the valve body or casing against which the face of the valve disk $E^2$ presses. Said ring G may be held in place by appropriate pins $g$ and is of course perforated at points coincident with the ports in the valve body. The valve disk $E^2$ is provided with annular metal ridges $h$, which are concentric with one another and engage the ring G on annular lines within and without the circle embracing the valve ports. To seat each disk firmly, an adjusting cone K may be employed for each, said cone impinging against the outside face of the disk and being held by a lock nut L. The annular ridges on the valve disk press firmly against the leather or other washer and produce a liquid-tight joint which prevents escape of the liquid in an improper way from one port to another or from the ports to the central shaft A, which therefore requires no packing. If desired, the seat beneath the ring or washer G may have annular depressions immediately opposite the annular ridges on the valve disk, thus aiding in the formation of a good joint.

The shaft A passes freely through the valve body as indicated, but the disk $E^2$ is held against rotation on the shaft by a suitable spline which will permit the longitudinal adjustment of the disk for the purpose of taking up wear and insuring a good liquid-tight joint at the packing ring G. The pins $g$ prevent the turning of the ring G upon the seat. This particular construction of valve seat is not claimed herein as it forms the subject of claims of my application for patent filed Nov. 1st, 1905, S. N. 285,393 of which my present application is a division.

By the use of the invention it will be seen that not only are the portions of the liquids employed positively and accurately determined by the cubic capacity of each measuring cylinder but that in the case of the carbonated liquid there is no opportunity for variation of the amount which would rise from the collection of gases as is the case with a measuring cylinder closed at one end and from which the carbonated liquid is drawn by gravity.

In the latter form of apparatus the measuring cylinder must be located above the point of delivery in order to allow the liquid to be drawn by gravity and there is an opportunity for collection of gas at the top of the cylinder or receiver, whereas, when the piston-measuring cylinder is employed and liquid forced therefrom by pressure, the said cylinder may be located below the delivering point so that gas cannot remain in the cylinder. Moreover, with my apparatus there need be no delay in drawing a fresh drink, since, during the discharge of the constituents of one drink, a fresh drink is prepared in the apparatus with the desired proportions of ingredients. It will further be seen that the apparatus is simple and cheap to construct and that the valve portions thereof, which control respectively the two kinds of liquids may be readily inspected and repaired without interference with one another.

What I claim as my invention is:

1. In an apparatus for measuring, mixing and delivering mixed drinks, the combination of a piston measuring-cylinder for the carbonated liquid, a valve shaft, a valve operated thereby and adapted to connect the opposite ends of said cylinder in alternation with the supply source of carbonated liquid and with the discharge pipe, a second piston measuring-cylinder for the other ingredient of the drink and a second valve operated by said shaft and adapted to connect the opposite ends of the latter cylinder in alternation to their source of supply and to the discharge pipe simultaneously with the alternate operations of the first-named valve, as and for the purpose described.

2. In an apparatus for measuring, mixing and delivering carbonated liquid and a flavoring syrup, the combination of a shaft, two four-way valves mounted thereon, a piston measuring-cylinder, a discharge pipe, valve ports and connections for connecting the opposite ends of said cylinder alternately with the inlet pipe leading from the source of supply and with the discharge pipe, a piston measuring-cylinder for the syrup, and ports and connections for the second valve adapted to connect the opposite ends of the latter cylinder alternately with their inlet supply pipe and with the discharge pipe simultaneously with the connections established for the first-named cylinder, all as described, so that a fixed quantity of carbonated liquid and of syrup will be measured in one end of said cylinders simultaneously with the forcing out from said cylinders of the previously measured contents thereof into the common discharge pipe.

3. In an apparatus for dispensing mixed drinks, the combination of two valves, a common shaft for the same, a measuring device for one of said valves consisting of a cylinder and piston, a measuring device for the other valve consisting of a cylinder and piston, a common discharge pipe into which the contents of each cylinder are delivered by the action of the appropriate valve, and an ejector nozzle opening into said discharge pipe and leading from the outlet of one of said cylinders as and for the purpose described.

4. In an apparatus for measuring, mixing and delivering mixed drinks, the combination of two sets of measuring devices for the two liquids respectively, each consisting of a piston measuring-cylinder, and a pair of valves having ports and connections adapted, as described, one to connect the opposite ends of one cylinder alternately with an inlet pipe leading from the source of supply of one liquid and with a common discharge pipe, and the other adapted to connect the opposite ends of the second cylinder alternately with a source of supply of the other liquid and with the discharge pipe simultaneously with the connections established for the first-named cylinder, all as described, so that a fixed quantity of both liquids will be measured simultaneously in one end of the two cylinders simultaneously with the conjoint ejection of the previously measured quantities of said liquids measured therein as and for the purpose described.

5. In an apparatus for measuring, mixing and delivering mixed drinks, the combination of a piston measuring-cylinder for the carbonated liquid, a faucet having valve ports and connections adapted to connect the opposite ends of the piston measuring-cylinder in alternation with a supply source of carbonated liquid and with the discharge pipe, a second piston measuring-cylinder and valve ports and connections adapted to connect the opposite ends thereof in alternation to a source of supply of flavoring syrup and to the discharge pipe simultaneously with the alternate connections of the first-named cylinder.

6. In an apparatus for measuring, mixing and delivering liquids, the combination of a piston measuring-cylinder for one liquid, a faucet having valve ports and connections adapted to connect the opposite ends of said cylinder in alternation with the supply source and with the discharge pipe, a second piston measuring-cylinder for another liquid entering into the mixture, and valve ports and connections of said faucet adapted to connect the opposite ends of the latter cylinder in alternation to the source of supply of the other liquid and to the discharge pipe simultaneously with the alternate connections of the first-named cylinder.

7. A vending machine, comprising a plurality of fluid pressure operated pumps, a common discharge for the pumps, a valve for controlling the operation of each pump, a common operating means for the valves, and means for actuating the operating means.

Signed at New York in the county of New York and State of New York this 27th day of December A. D. 1907.

HARRY SEYMOUR CORNISH.

Witnesses:
C. F. TISCHNER, Jr.,
LILLIAN BLOND.

Copies of this patent may be obtained for five cents each, by addressing the " Commissioner of Patents, Washington, D. C."